United States Patent
Balakrishnan et al.

[11] Patent Number: 6,038,102
[45] Date of Patent: Mar. 14, 2000

[54] CONDUCTOR TRACE ARRAY HAVING INTERLEAVED PASSIVE CONDUCTORS

[75] Inventors: Arun Balakrishnan, Fremont; Stephen P. Williams, Morgan Hills, both of Calif.

[73] Assignee: Quantum Corporation, Milpitas, Calif.

[21] Appl. No.: 08/784,559

[22] Filed: Jan. 21, 1997

[51] Int. Cl.[7] ............................................. G11B 5/48
[52] U.S. Cl. ................................... 360/104; 360/108
[58] Field of Search ............................. 360/104, 105, 360/106, 108; 333/1, 238, 246; 174/32, 33, 34, 35 R; 361/749, 751, 772, 774, 776, 777, 778

[56] References Cited

U.S. PATENT DOCUMENTS

| | | | |
|---|---|---|---|
| 4,362,899 | 12/1982 | Borrill .................................. | 174/32 X |
| 4,761,699 | 8/1988 | Ainslie et al. ...................... | 360/103 |
| 4,996,623 | 2/1991 | Erpelding et al. ................... | 360/104 |
| 5,001,583 | 3/1991 | Matsuzaki ............................ | 360/104 |
| 5,006,946 | 4/1991 | Matsuzaki ............................ | 360/104 |
| 5,491,597 | 2/1996 | Bennin et al. ....................... | 360/104 |
| 5,606,477 | 2/1997 | Erpelding et al. ................... | 360/104 |
| 5,612,840 | 3/1997 | Hiraoka et al. ...................... | 360/104 |
| 5,631,786 | 5/1997 | Erpelding ............................ | 360/104 X |
| 5,631,788 | 5/1997 | Richards ............................. | 360/104 |
| 5,663,854 | 9/1997 | Grill et al. ........................... | 360/104 |

OTHER PUBLICATIONS

Excerpt, Dorf, Ed., *The Electrical Engineering Handbook*, CRC Press, Boca Raton, Fl., ©1993, pp. 884–885.

*Primary Examiner*—William R. Korzuch
*Attorney, Agent, or Firm*—David B. Harrison

[57] ABSTRACT

A trace conductor array includes an electrically insulative support substrate and a plurality of electrical signal trace conductors formed along substantially parallel paths in a single layer on the substrate. The electrical signal trace conductors each have a plurality of spaced apart trace conductor segments. Passive electrical trace conductors are formed on the substrate in spaces between the spaced apart adjacent trace conductor segments, and are spaced apart and electrically isolated therefrom. The passive trace conductors generally follow a geometry of the spaced apart segments and thereby repel magnetic flux lines at higher frequencies and result in decoupling of the high frequency current-carrying conductor trace segments. A preferred application is for interconnecting a head and a preamplifier/drive circuit within a hard disk drive.

3 Claims, 6 Drawing Sheets

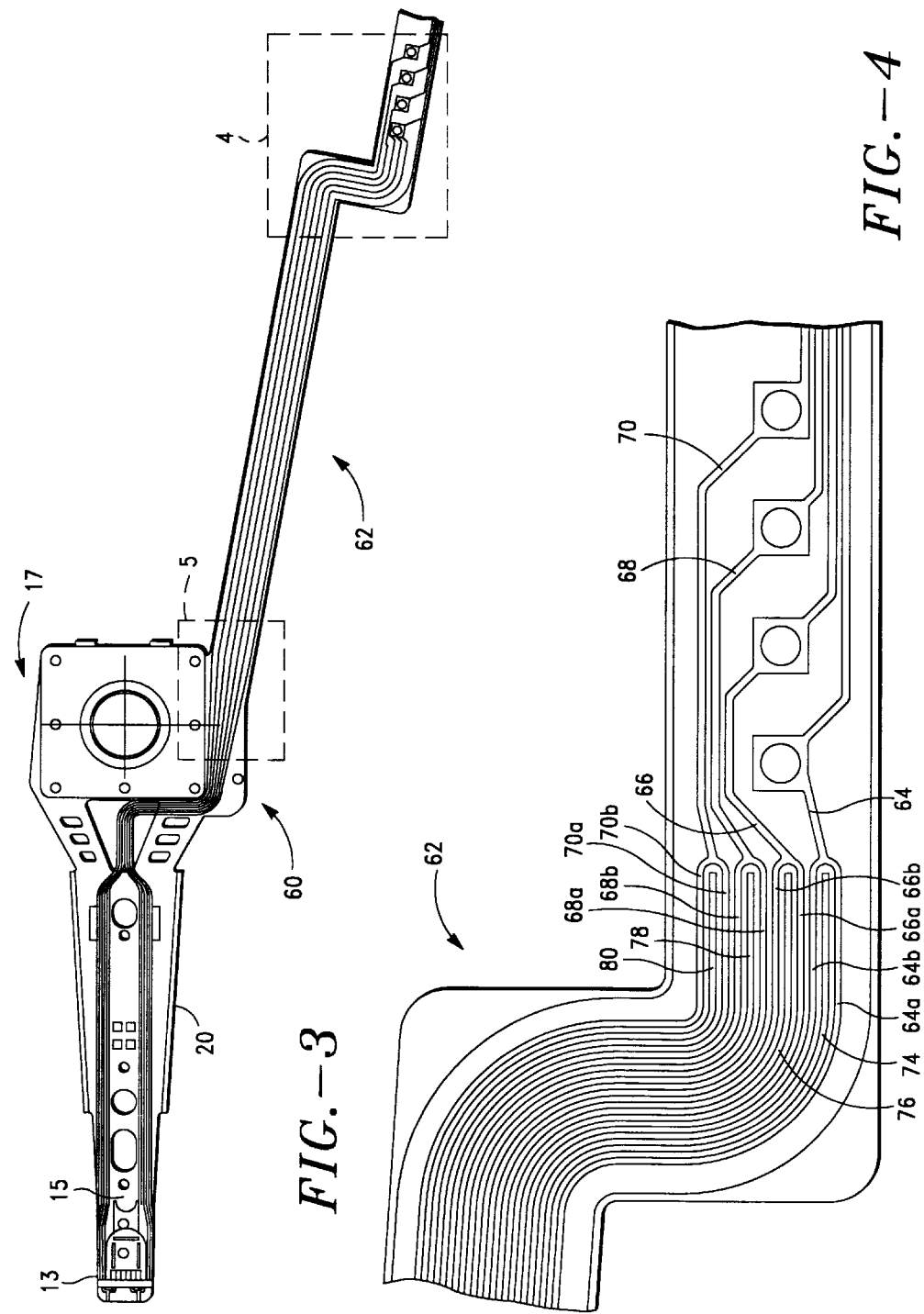

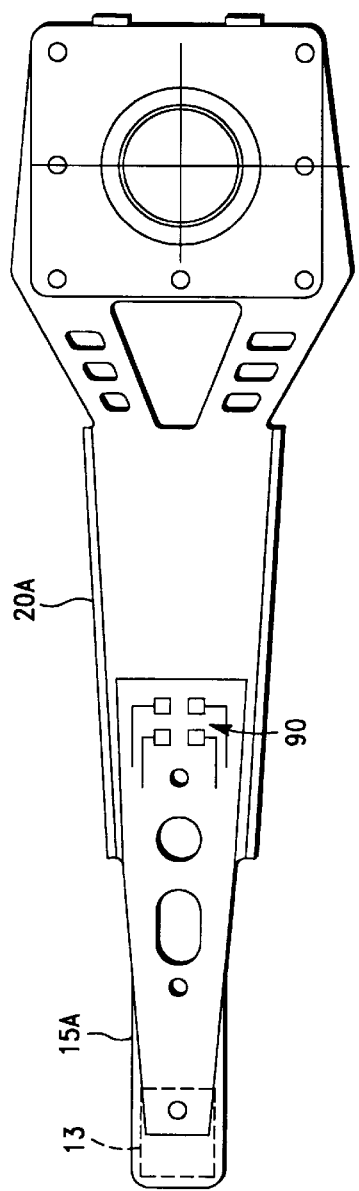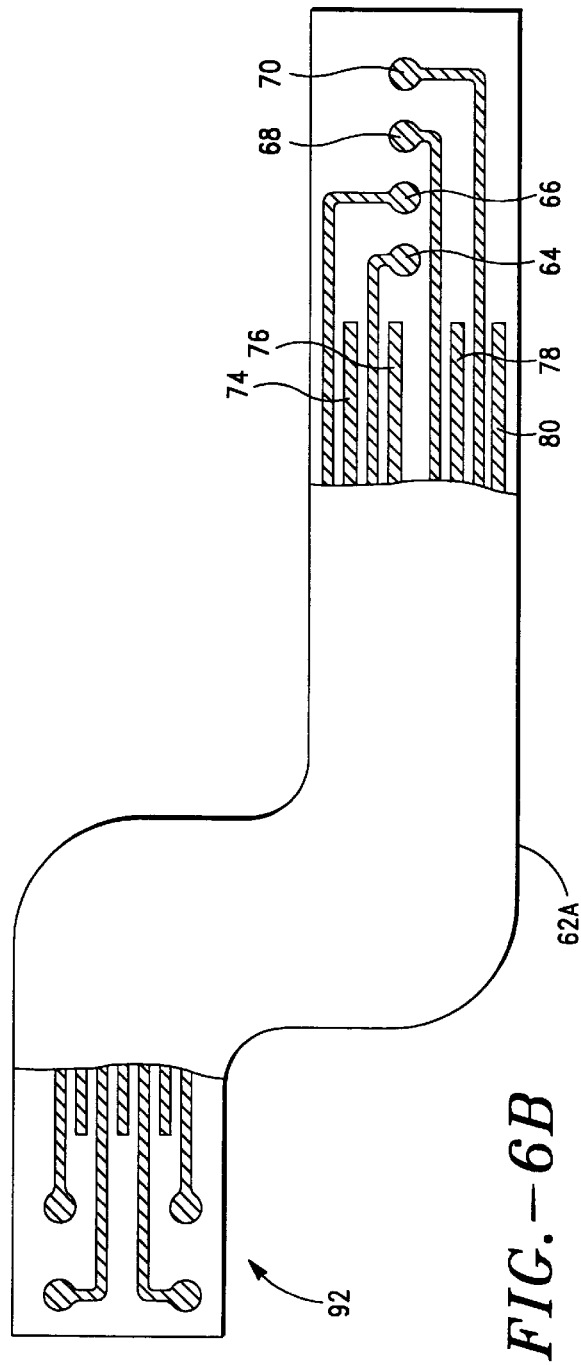
FIG.-6A
FIG.-6B

CONDUCTOR TRACE ARRAY HAVING INTERLEAVED PASSIVE CONDUCTORS

FIELD OF THE INVENTION

This invention relates generally to structure and method for controlling electrical properties of a conductor trace array for connecting a magnetic head to electronics in a magnetic hard disk drive. More particularly, the present invention provides electrically isolated ("passive") conductor strips which are interleaved with current-carrying ("active") conductor strips to improve impedance characteristics of the conductor trace array.

BACKGROUND OF THE INVENTION

Contemporary magnetic hard disk drives typically include a rotating rigid storage disk and a head positioner for positioning a data transducer at different radial locations relative to the axis of rotation of the disk, thereby defining numerous concentric data storage tracks on each recording surface of the disk. The head positioner is typically referred to as an actuator. Although numerous actuator structures are known in the art, in-line rotary voice coil actuators are now most frequently employed due to their simplicity, high performance, and their ability to be mass-balanced about their axis of rotation, the latter being important for making the actuator less sensitive to perturbations. A closed-loop servo system within the disk drive is conventionally employed to operate the voice coil actuator and thereby position the heads with respect to the disk storage surface.

The read/write transducer, which may be of a single or dual element design, is typically deposited upon (or carried by) a ceramic slider structure having an air bearing surface for supporting the transducer at a small distance away from the surface of the moving medium. Single write/read element designs typically require two-wire connections while dual designs having separate reader and writer elements require two pairs of two-wire connections. Magnetoresistive (MR) heads having separate inductive write elements in particular generally require four wires. The combination of an air bearing slider and a read/write transducer is also known as a read/write head or a magnetic recording head.

Sliders are generally mounted to a gimbaled flexure structure attached to the distal end of a suspension's load beam structure. A spring biases the load beam and the head towards the disk, while the air pressure beneath the head developed by disk rotation relative to the slider pushes the head away from the disk. The gimbal enables the slider to present a "flying" attitude toward the disk surface and follow its topology. An equilibrium distance defines an "air bearing" and determines the "flying height" of the head. By utilizing an air bearing to support the head away from the disk surface, the head operates in a hydrodynamically lubricated regime at the head/disk interface rather than in a boundary lubricated regime. The air bearing maintains a spacing between the transducer and the medium which reduces transducer efficiency. However, the avoidance of direct contact vastly improves the reliability and useful life of the head and disk components. Demand for increased areal densities may nonetheless require that heads be operated in pseudo-contact or even boundary lubricated contact regimes, however.

Currently, nominal flying heights are on the order of 0.5 to 2 microinches. The magnetic storage density increases as the head approaches the storage surface of the disk. Thus, a very low flying height is traded against device reliability over a reasonable service life of the disk drive. At the same time, data transfer rates to and from the storage surface are increasing; and, data rates approaching 200 megabits per second are within practical contemplation.

The disk drive industry has been progressively decreasing the size and mass of the slider structures in order to reduce the moving mass of the actuator assembly and to permit closer operation of the transducer to the disk surface, the former giving rise to improved seek performance and the latter giving rise to improved transducer efficiency that can then be traded for higher areal density. The size (and therefore mass) of a slider is usually characterized with reference to a so-called standard 100% slider ("minislider"). The terms 70%, 50%, and 30% slider ("microslider", "nanoslider", and "picoslider", respectively) therefore refer to more recent low mass sliders that have linear dimensions that are scaled by the applicable percentage relative to the linear dimensions of a standard minislider. Sliders smaller than the 30% picoslider, such as a 20% "femtoslider", are presently being considered and are in early development by head vendors. As slider structures become smaller, they generally require more compliant gimbals; hence, the intrinsic stiffness of the conductor wires attached to the slider can give rise to a significant undesired mechanical bias effect.

Trace interconnect arrays are now being proposed to support or aid in supporting the slider next to the data storage surface, and to connect read and write elements of the head with external circuitry. Two conductor paths are typically required for the write element, and two separate conductor paths are required for the read element, of the magnetic head. The interconnect array, typically formed on a polyimide film substrate, may extend from the slider to a preamplifier/write driver circuit, either directly, or via one or more intermediate interconnect trace arrays. These designs typically include trace segments extending from the flexure to a signal connection point which may be located on the side of the rotary actuator, for example. Since these trace conductor interconnect arrays are flat, and are precisely formed printed circuits upon plastic film substrates, they tend to have more predictable mechanical properties than discrete wire conductors used in the past, thereby reducing tolerances in manufacturing and operation.

In transmission lines and interconnects of the type under contemplation, it is important to reduce the effect of the interconnect on the source (preamp for write element transducer for read element, of magnetic recording head, for example). The inductance and capacitance parameters of the trace array introduce a phase-change in the current/voltage waveforms, and most designs are made to minimize undesired effects of inductance and/or capacitance upon overall circuit performance.

One method to achieve reduced effect of inductance and/or capacitance is to ensure that reactive components of the interconnect are minimal. Usually, there is a trade-off between the inductance and the capacitance, since reducing inductance means moving the conductors closer together which increases the inter-conductor capacitance. Once conductor spacing is fixed at a minimum distance limited by manufacturing tolerances, the inductance can be further reduced by increasing the conductor width, which also results in a slight increase in inter-conductor capacitance, and a potentially significant increase in conductor-to-ground capacitance if a ground plane is nearby.

Since the amount of space available for the trace interconnect array is limited, the conductors can only be widened to a certain extent. This tradeoff between reduced inductance and increased capacitance results in a very inefficient trace interconnect array design. Because of skin-effects and/or proximity-effects present at high signal frequencies, the signal current is pushed toward the crosssectional perimeter of the conductor, and the conductor cross-section is thus not utilized for carrying the signal current to the fullest extent. Therefore, the current distributes itself around the perimeter of the conductor cross-section and the resultant resistance and inductance are perimeter effects, rather than crosssectional area effects. Thus, reduction in inductance by widening the conductor follows a law of diminishing returns.

There are established methods which attempt to address or solve this problem. It has already been shown that the current distribution can be greatly improved by splitting wide conductors into a number of parallel conductive segments to reduce the resistance and inductance of the interconnect, see commonly assigned, U.S. patent application Ser. No. 08/726,450 filed on Oct. 3, 1996, now U.S. Pat. No. 5,717,547, for "Multi-Trace Transmission Lines for R/W Head Interconnect in Hard Disk Drive" by James A. Young, the disclosure thereof being incorporated herein by reference. While this approach has the advantage of reducing inductance, it results in increased interconnect capacitance, and increased implementation complexity, including multiple layers and bridge vias, or addition of bridging jumpers, at both ends of the conductor trace array.

Also, a microstrip configuration which uses perfectly registered conductors results in very high values of capacitance for reductions of inductance. Reducing the capacitance requires very thin conductors which increases the resistance by a few orders of magnitude. Additionally, while multi-layered geometries can realize certain improvements in electrical characteristics, multi-layers are more expensive to fabricate than single-layered geometries, see e.g. the present inventor's commonly assigned U.S. patent application Ser. No. 08/720,833 filed on Oct. 3, 1996, for "Suspension with Multi-Layered Integrated Conductor Trace Array for Optimized Electrical Parameters", the disclosure thereof being incorporated herein by reference.

Thus, a hitherto unsolved need has remained for a trace interconnect array having more effectively controlled inductance and capacitance characteristics.

SUMMARY OF THE INVENTION WITH OBJECTS

A general object of the present invention is to improve electrical characteristics of a conductor trace array for electrically interconnecting a read/write head to associated read/write circuitry in a manner which overcomes limitations and drawbacks of the prior art.

Another object of the present invention is to improve electrical impedance characteristics of a conductor trace array by providing electrically isolated, passive conductor traces which are interleaved between current carrying trace conductors.

A further more specific object of the present invention is to provide electrically isolated, passive conductor traces between current carrying traces of a conductor trace array in a manner in which magnetic flux of opposite direction becomes induced in the passive conductor traces and cancels magnetic flux lines at higher frequencies, resulting in decoupling of otherwise adjacent current-carrying conductor trace segments, in a manner overcoming limitations and drawbacks of the prior art.

One more specific object of the present invention is to employ conventional two-conductor trace array fabrication techniques to form a three-conductor trace array in which outside conductors divide a unidirectional current flow and an interleaved passive conductive trace repels resultant flux at higher frequencies in a manner reducing inductance of the drive trace pair without increasing capacitance, thereby improving and tuning electrical impedance characteristics of the trace conductor array.

Yet another specific object of the present invention is to provide a conductor trace array having improved electrical characteristics within a single layer conductor trace array formed at relative low complexity and expense with existing techniques.

Accordingly, a trace conductor array is provided for connecting a read/write head/slider assembly in a head-disk assembly and adjacent to a rotating data storage medium to read/write circuitry within the head-disk assembly of a hard disk drive. The trace conductor array includes an electrically insulative support substrate and a plurality of electrical signal trace conductors formed along substantially parallel paths in a single layer on the substrate. The electrical signal trace conductors each have a plurality of spaced apart trace conductor segments. In accordance with the present invention, passive electrical trace conductors are formed on the substrate in spaces between the spaced-apart adjacent trace conductor segments, and are spaced apart and electrically isolated therefrom. The passive trace conductors generally follow a geometry of the spaced-apart segments and thereby repel magnetic flux lines at higher frequencies and result in decoupling of the high frequency current-carrying conductor trace segments.

In a related aspect of the present invention the plurality of electrical signal trace conductors are symmetrical along the spaced-apart trace conductor segments.

As a specific example of the present invention, four electrical signal trace conductors are formed in the single layer on the substrate and follow generally parallel paths: two of the conductors are for electrically connecting a read element of the head to a preamplifier circuit, and two of the conductors are for connecting a write element of the head to a write driver circuit. At least one or some of the trace conductors are divided into longitudinal segments wherein each segment surrounds a spaced-apart passive electrical trace conductor in order to realize the advantages of the present invention.

As another aspect of the present invention an integrated load beam/trace conductor assembly is provided for supporting a read/write head/slider assembly adjacent to a rotating data storage medium of a hard disk drive and for electrically interconnecting the head to read/write circuitry of the drive. The integrated load beam assembly comprises a flexure and a trace conductor array. The flexure includes a generally planar conductive member extending to proximity of the read/write head/slider assembly, a first electrical insulation layer disposed on the conductive member, and a plurality of electrical traces disposed on the first electrical insulation layer and connected to read and write elements of the head/slider assembly, the flexure being secured to a load beam. The trace conductor array interconnects connection pads of the electrical traces and the read/write circuitry and comprises an electrically insulative support substrate, and a plurality of electrical signal trace conductors formed along substantially parallel paths in a single layer on the electrically insulative support substrate. The electrical signal trace conductors each have a plurality of spaced apart trace conductor segments. Passive electrical trace conductors are formed on the substrate in spaces between the spaced apart trace conductor segments, and are spaced apart therefrom.

The passive conductors generally follow a geometry of the spaced apart segments. Preferably, the electrically insulative support substrate comprises a thin flexible polyimide film.

These and other objects, advantages, aspects, and features of the present invention will be more fully appreciated and understood upon consideration of the following detailed description of preferred embodiments presented in conjunction with the accompanying drawings.

BRIEF DESCRIPTION OF THE DRAWINGS

In the Drawings:

FIG. 3 is an enlarged diagrammatic plan view of a trace interconnect array included in the FIG. 2 head disk assembly and showing an integrated flexure/conductor load beam structure and an elongated interconnect segment extending from the load beam structure toward preamplifier/driver circuitry and having conductive traces separated by passive conductor strips in accordance with principles of the present invention.

FIG. 4 is an enlarged detail plan view of a portion of the FIG. 3 trace interconnect array surrounded by a dashed line box 4 in FIG. 3 and showing one end of in-plane passive conductor strips.

FIG. 6A is an enlarged diagrammatic plan view of an alternative head-gimbal-load beam assembly for inclusion within the FIG. 2 head disk assembly.

FIG. 6B is an enlarged diagrammatic plan view of a four-conductor trace conductor array scaled to be attached to the FIG. 6A head-gimbal-load beam assembly and incorporating passive conductor strips in accordance with principles of the present invention.

DETAILED DESCRIPTION OF PREFERRED EMBODIMENTS

Figure 1:
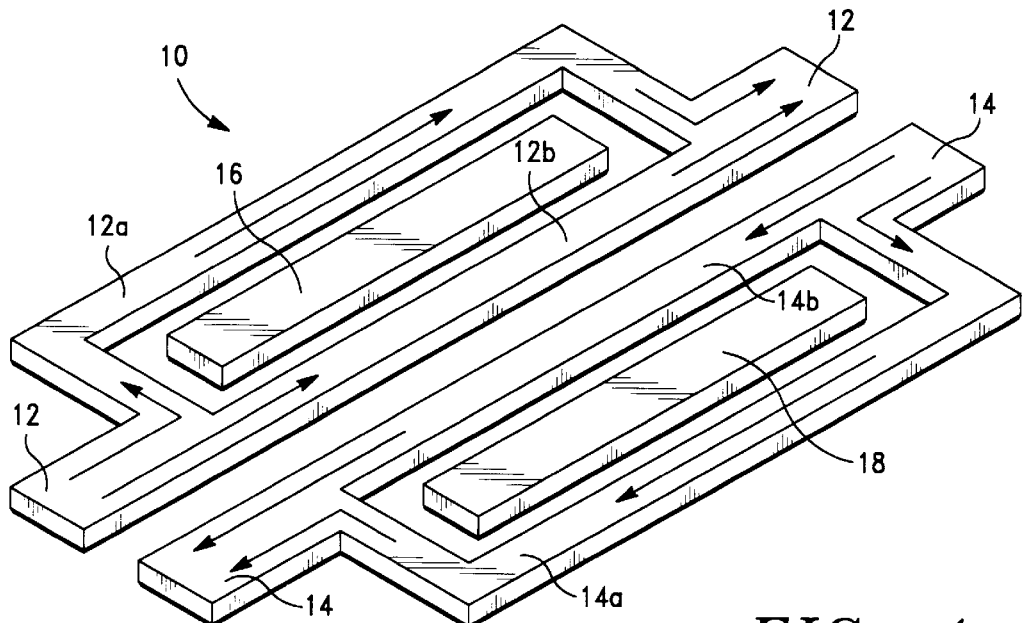
FIG. 1 is a greatly enlarged, highly diagrammatic isometric view of a two-conductor trace conductor array incorporating passive conductor strips in accordance with principles of the present invention.

Referring to the drawings, where like characters designate like or corresponding parts throughout the views, FIG. 1 presents a highly diagrammatic, isometric view of a two-conductor single-layer trace interconnect array 10 incorporating passive conductor strips 16 and 18 in order to improve impedance characteristics in accordance with principles of the present invention. In FIG. 1, two parallel active trace conductors 12 and 14 are carrying signal current. Trace 12 carries current in e.g. a forward direction, while trace 14 carries current in a reverse direction, as shown by arrows in FIG. 1. Trace conductors 12 and 14 include elongated longitudinal regions which are respectively separated into segments 12a–12b, and 14a–14b. At high frequencies and due to proximity and skin effects, the current squeezes toward the edges of the cross-sections of conductors 12 and 14 (and segments 12a, 12b, 14a, 14b). By separating the conductors 12 and 14 into a plurality of elongated segments (only two segments are shown per conductor in FIG. 1, but more than two conductive segments may be employed), the signal current is divided between the conductive segments which in the present example are spaced apart from each other. This arrangement therefore lowers the effective resistance of the conductive trace segments 12a, 12b, 14a and 14b.

The segment 12a is spaced laterally apart from the segment 12b to leave a first elongated open area within the same plane or layer; and, the segment 14a is spaced laterally apart from the segment 14b to leave a second elongated open area within the same layer. A passive conductor 16 is formed in the same layer in the first open area between segments 12a and 12b, and a passive conductor 18 is formed in the same layer in the second open area between segments 14a and 14b.

When active conductive traces 12 and 14 carry high frequency signal currents, resultant flux lines of opposite sense are induced in the passive conductor strips 16 and 18. These resultant flux lines of opposite sense effectively cancel some of the flux lines between the active conductor traces 12 and 14. The resultant decoupling between the segments 12a and 12b, and 14a and 14b, further reduces the inductance of the trace interconnect array 10. Since in the preferred embodiment of the present invention the conductor layout is preferably confined to a single printed circuit layer, the inter-conductor capacitance does not change. For the same inductance, the capacitance to ground is significantly reduced. Also, since the passive conductor strips 16 and 18 are formed in the same plane (layer) as the patterns defining conductor traces 12 and 14, and their respective segments 12a, 12b, 14a and 14b, there is no additional cost associated in fabricating trace interconnect arrays which desirably include the passive conductor strips, e.g. strips 16 and 18 of the FIG. 1 generalization.

Figure 2:
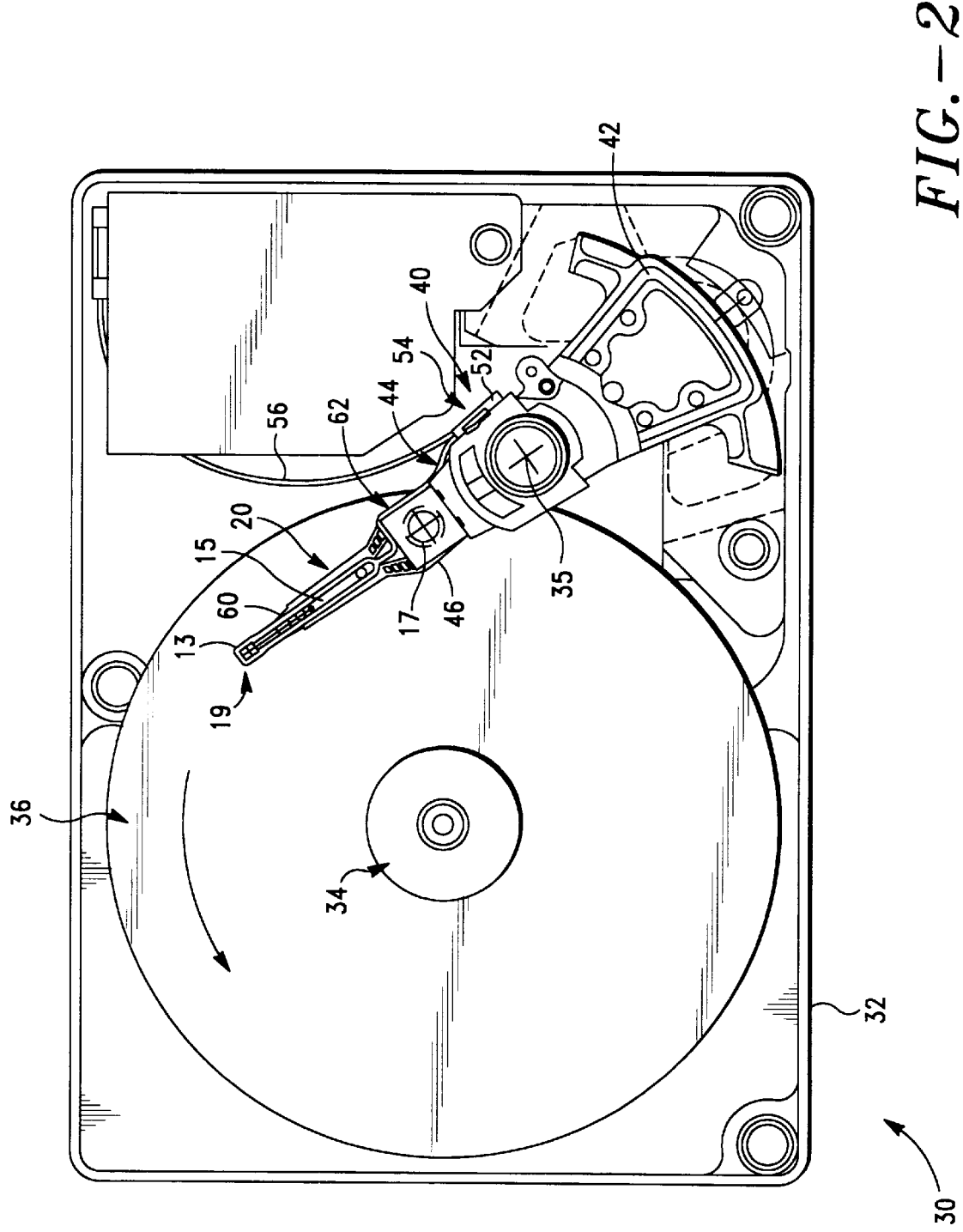
FIG. 2 is an enlarged, diagrammatic plan view of a head disk assembly of a hard disk drive which includes an actuator having a suspension assembly with a conductive trace array with passive conductor strips in accordance with principles of the present invention.

FIG. 2 represents a top plan view of a head/disk assembly (HDA) of a hard disk drive 30. The hard disk drive 30 employs at least one load beam assembly 20 having a trace interconnect array 60 as a preferred embodiment of the present invention. FIG. 2 shows the load beam assembly 20 which includes at a distal end 19 a head 13 supported by a flexure 15 and the trace interconnect array 60 employed within its intended operating environment.

In the present example disk drive 30 includes e.g. a rigid base 32 supporting a spindle 34 (and spindle motor, not shown) for rotating at least one storage disk 36 in a direction shown by the curved arrow. Drive 30 also includes a rotary actuator assembly 40 rotationally mounted to the base 32 at a pivot point 35. The actuator assembly 40 includes a voice coil 42 which, when selectively energized by control circuitry (not shown), moves and thereby positions an actuator E-block 44 and head arms 46 (and load beam assemblies 20) at radial track positions defined on the facing surfaces of storage disks 36. At least one of the load beam assemblies 20 is secured at its proximal end 17 to a distal end of a head arm 46, e.g. by conventional ball-swaging techniques.

Conventionally, but not necessarily, two load beam assemblies 20 are attached to head arms 46 between disks 36; and, one load beam structure 20 is attached to a head arm above and a head arm below the uppermost and lowermost disks of a disk stack comprised of multiple disks 36 spaced apart on spindle 34. The trace interconnect structure 60 may connect directly to a preamplifier circuit substrate. In FIG. 2 the interconnect structure 60 preferably includes a flexible trace/film segment 62 which in-turn extends to a hybrid circuit substrate 52 secured to a side of the E-block 44. The hybrid circuit 52 typically comprising a suitable substrate whether it be e.g. a trace-patterned polyimide film base or a trace-patterned ceramic base, and it secures and connects a semiconductor chip 54 forming a read preamplifier/write driver circuit to read and write elements of the magnetic recording head 12. Most preferably, the chip 54 is nested between the hybrid circuit 52 and the E-block sidewall, and is secured to the sidewall by a suitable conductive adhesive or thermal transfer compound such that heat generated during operation of the chip 54 is dissipated into the E-block by conduction, and outwardly into the ambient air volume by convection. Another flex circuit 56 provides electrical connections to and from the substrate 52 and other electronic circuitry of the disk drive (not shown in FIG. 2).

FIG. 3 shows a more detailed view of a trace interconnect structure 60 and segment 62. The load beam structure 20 is described in greater detail in commonly assigned, copending U.S. patent application Ser. No. 08/720,836 filed on Oct. 3, 1996, for "Suspension With Integrated Conductors Having Trimmed Impedance", by the present inventors and others, the disclosure thereof being incorporated herein by reference. As improved by the present invention, the interconnect structure includes at least segment 62 carrying a plurality of passive conductor traces in an elongate portion extending between the preamplifier 54 and the load beam 20. Ideally, the passive conductor traces may extend for virtually the entire distance between the head 13 and the preamplifier 54, depending upon whether or not a minute size of the trace assembly along the flexure portion 15 effectively precludes integration of passive conductor traces at a reasonable cost.

Figure 5:
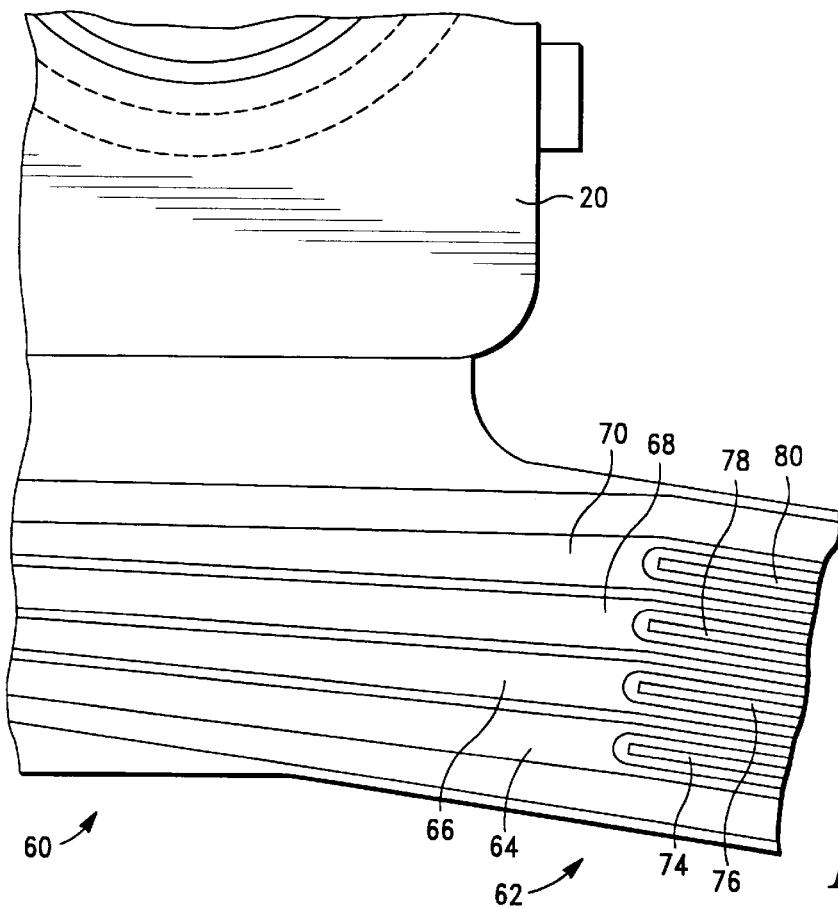
FIG. 5 is an enlarged detail plan view of another portion of the FIG. 3 trace interconnect array surrounded by a dashed line box 5 in FIG. 3, and showing another end of the in-plane passive conductor strips.

FIGS. 4 and 5 provide enlarge views of end portions of segment 62. FIG. 4 is an enlargement of a portion enclosed by a dashed-line block 4, and FIG. 5 is an enlargement of a portion enclosed by a dashed-line block 5, in FIG. 3.

As perhaps best viewed in FIGS. 4 and 5, segment 62 includes two major conductive path pairs: a read current path pair comprising conductors 64 and 66, and a write current path pair comprising conductors 68 and 70. Along the array segment 62, each conductor is divided into two spaced apart, current carrying active segments. Conductor 64 includes segments 64a and 64b; conductor 66 includes segments 66a and 66b; conductor 68 includes segments 68a and 68b; and, conductor 70 includes segments 70a and 70b. These conductor segments respectively define elongated spaces occupied by passive conductor traces 74, 76, 78 and 80. The passive trace 74 lies between segments 64a and 64b; the passive trace 76 lies between segments 66a and 66b; the passive trace 78 lies between segments 68a and 68b; and, the passive trace 80 lies between segments 70a and 70b.

Because of the skin and proximity effects, the currents flowing in conductors 64, 66 and 68, 70 and resultant electromagnetic fields have difficulty penetrating conductor material at high frequencies. By moving current carrying segments 64a–64b, 66a–66b, 68a–68b, and 70a–70b apart, the conductors are effectively decoupled as inductors. By introducing the conductive and unconnected passive conductor between each of the two current-carrying segments, the fluxes resulting from current flows in the segments induce flux of opposite sense in the passive elements. The net result is a lowering of overall trace array inductance.

FIGS. 6A and 6B illustrate an alternative arrangement in which a flexure/trace conductor array 15A is secured to a load beam 20A. The head slider 12 is mounted to the flexure 15A and connected to traces, not shown, leading to a connection pad area 90. A trace conductor array 62A is contoured so that a connection pad region 92 is connected to the array 15A at the connection pad area 90. In this manner, the benefits of the passive conductor traces 74, 76, 78 and 80 may be extended to a location closer to the head 13 than with the example of FIGS. 3–5. Otherwise, the trace conductor array 62A is formed in the same manner illustrated for the array 62.

In one practical example of a two-conductor trace array formed on a polyimide base, each conductor was separated into segments of 10 microns by 30 microns and spaced 90 microns apart (each segment being spaced 30 microns from a 10 microns by 30 microns passive conductor strip). In this circuit arrangement, the resultant inductance for a 30 millimeter segment length at an operating frequency of 100 MHz was approximately 13 nanoHenrys, which is a 14% decrease over an equivalent four-segment conductor array. While the resistance increased from 1.48 ohms to 2.5 ohms, the added resistance is reasonable in the present use environment. As tolerances are improved, and as spacing between the conductors are reduced, further improvements in electrical circuit parameters are realized.

Figure 7:
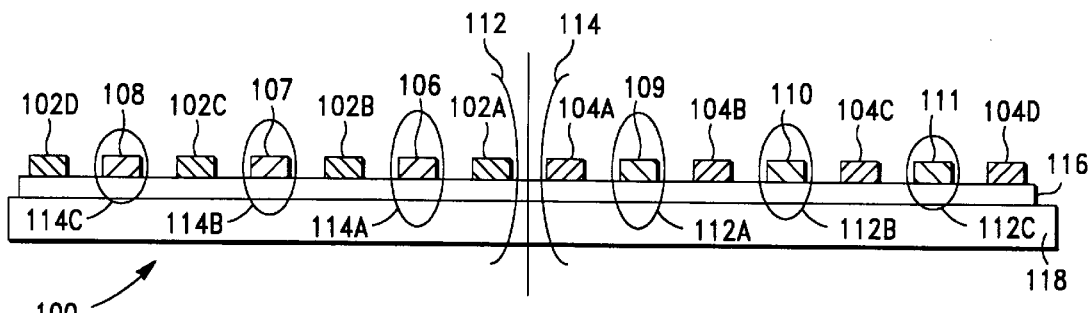
FIG. 7 is an enlarged diagrammatic cross-sectional view of a trace interconnect array having a plurality of in-plane passive conductor strips in each current direction.

FIG. 7 illustrates a trace array 100 including four forward current active conductor segments 102A, 102B, 102C and 102D, separated by three passive conductor traces 106, 107 and 108. Four reverse current active conductor segments 104A, 104B, 104C and 104D are separated by three additional passive conductor traces 109, 110 and 111. The trace array 100 is formed on a polyimide insulating layer 116 which is supported by a substrate 118, which may be a thin stainless steel flexure, or a load beam.

In the FIG. 7 arrangement, each conductor trace is preferably 20 millimeters across, and is separated by 20 millimeters from the next adjacent trace, except at a central flux division separating the current directions where the distance is e.g. 30 millimeters. Positive flux lines 112 and negative flux lines 114 are shown.

Positive flux envelopes the forward direction current conductors 102, except for islands 114A, 114B and 114C of induced negative flux surrounding the passive conductor traces 106, 107, and 108, respectively. The islands 114A, 114B and 114C flux resulting from opposite direction induction and resultant cancellation of the main flux envelope surrounding the active conductors 102. Similarly, negative flux envelopes the reverse direction current conductors 104, except for induced flux cancellation islands 112A, 112B and 112C of positive flux surrounding the passive conductor traces 109, 110 and 111, respectively.

Figure 8:
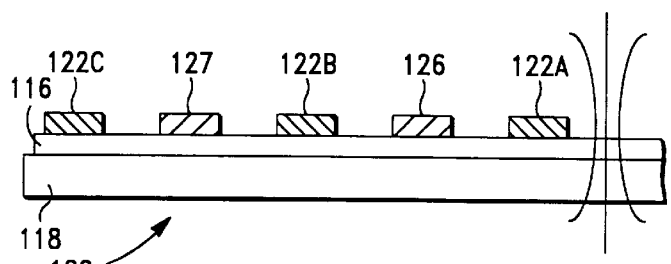
FIG. 8 is an enlarged diagrammatic cross-sectional view of one half of a trace interconnect array having a plurality of in-plane passive conductor strips in the illustrated current direction.

FIG. 8 illustrates another trace array 120 having 30 millimeter traces separated by 30 millimeter spaces. In this example, each current carrying direction has three active conductor segments, e.g. forward current carrying segments 122A, 122B, and 122C, separated by two passive traces, e.g. traces 126 and 127. The flux islands are not shown in FIG. 8 but are present to surround the passive conductor traces, as shown in FIG. 7.

Figure 9:
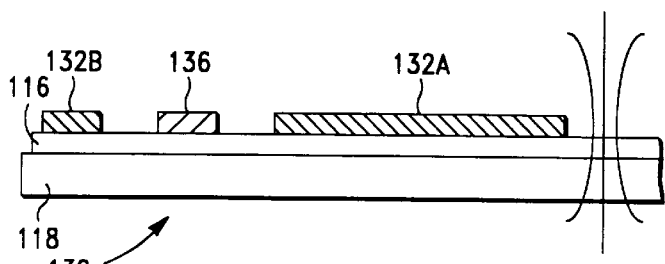
FIG. 9 is an enlarged diagrammatic cross-sectional view of one half of a trace interconnect array having a single in-plane passive conductor strip in the illustrated current direction.

FIG. 9 illustrates a further trace array 130 in which a main current carrying trace 132A (140 mm wide) is surrounded by a passive conductor trace 136 and an outer conductor trace segment 132B. The traces 132B and 136 are 30 millimeters wide, and are separated by 30 millimeters.

Figure 10:
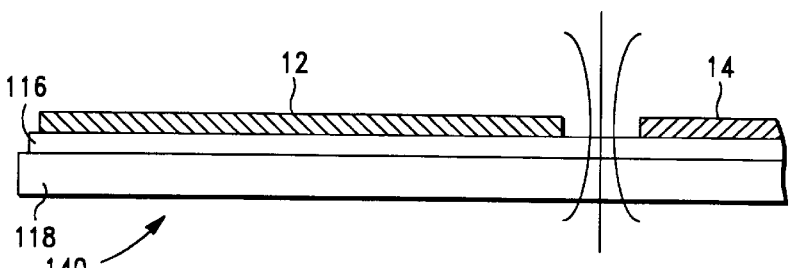
FIG. 10 is an enlarged diagrammatic cross-sectional view of one half of a conventional trace interconnect conductor pair.

FIG. 10 illustrates a conventional trace array 140 having two conductors 12 and 14, each 260 millimeters wide and separated by a 30 millimeter space.

Figure 11:
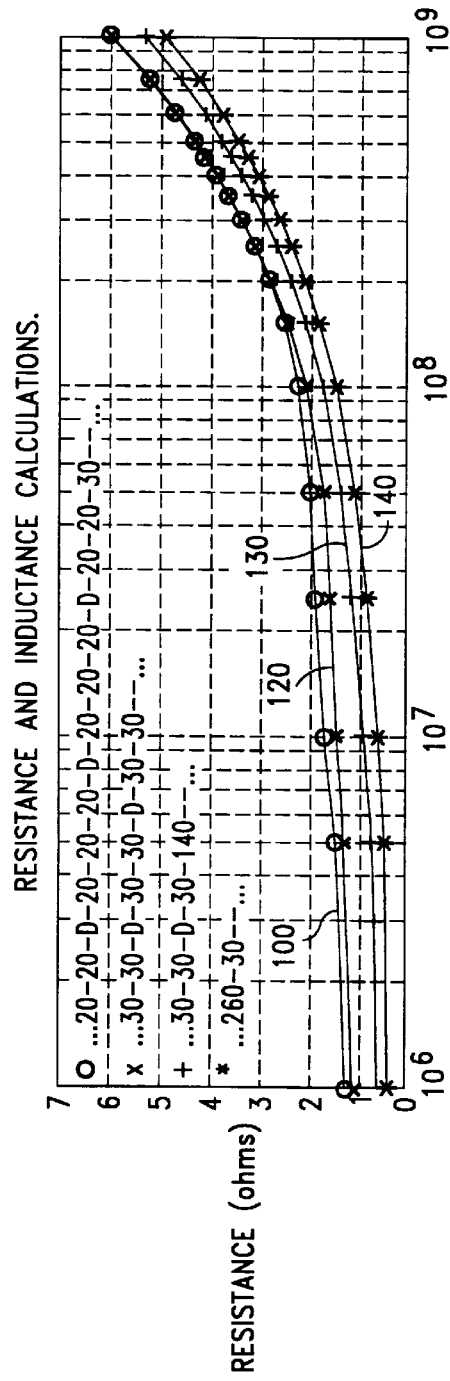
FIG. 11 is a graph plotting electrical resistance as a function of frequency for the FIGS. 7, 8, 9 and 10 trace interconnect arrays.
Figure 12:
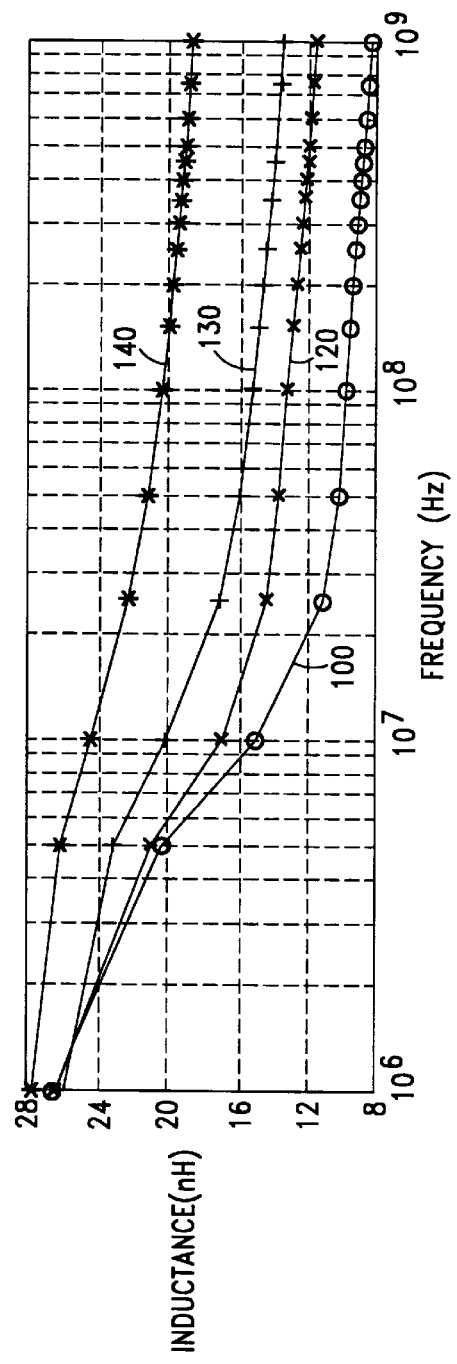
FIG. 12 is a graph plotting electrical inductance as a function of frequency for the FIGS. 7, 8, 9 and 10 trace interconnect arrays.

FIG. 11 presents a graph of change in resistance of a section of each of the trace arrays 100, 120, 130 and 140 as a function of increasing frequency. FIG. 12 presents a graph of change in inductance of each of the arrays 100, 120, 130 and 140 as a function of increasing frequency. While FIG. 11 shows that electrical resistance is relatively invariant depending upon trace array arrangement, FIG. 12 shows a significant decrease in inductance as a function of frequency for the trace arrays 100, 120 and 130 which incorporate passive trace conductors in accordance with principles of the present invention.

While the present invention has been illustrated by dividing a conductor trace into two spaced-apart segments, separated by a single passive conductor strip, those skilled in the art will appreciate that further improvements may be realized by providing multiple trace segments and passive conductor strips for each conductive lead. The passive conductor strips are ideally coextensive with the active conductors, but in some practical environments may not extend the full length of the active conductors between the head and the read/write preamplifier electronics. Also, the passive conductor strips may be included in a single trace conductor array, or they may be included within the structure of one of several trace conductor arrays connected in tandem between the head and the electronics circuitry.

Although the present invention has been described in terms of the presently preferred embodiment, i.e., a deposited trace conductor array which reduces conductor inductance without significantly increasing circuit distributed capacitance, it should be clear to those skilled in the art that the present invention may also be utilized in conjunction with, for example, an integrated gimbal load beam structure, or other conductive suspension members having proximately mounted, deposited, or embedded conductors with insulating overcoatings and shielding thereon. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An integrated load beam assembly for supporting a read/write head/slider assembly adjacent to a rotating data storage medium of a hard disk drive and for electrically interconnecting the head to read/write circuitry of the drive, the load beam assembly comprising:

a flexure including:
   a generally planar conductive member extending in the proximity of the read/write head/slider assembly;
   a first electrical insulation layer disposed on the conductive member;
   a plurality of electrical traces disposed on the first electrical insulation layer and connected to read and write elements of the head/slider assembly, the flexure being secured to a load beam, and a trace conductor array interconnecting connection pads of the electrical traces and the read/write circuitry and comprising:
   an electrically insulative support substrate;
   a plurality of electrical signal trace conductors formed along substantially parallel paths in a single layer on the electrically insulative support substrate,
   the electrical signal trace conductors each having a plurality of spaced apart trace conductor segments, and
   passive electrical trace conductors formed on the substrate in spaces between adjacent ones of the spaced apart trace conductor segments, and spaced apart therefrom, and generally following a geometry of the spaced apart trace conductor segments.

2. The integrated load beam assembly set forth in claim 1 wherein the electrically insulative support substrate comprises a thin flexible polyimide film.

3. The integrated load beam assembly set forth in claim 1 wherein the plurality of electrical signal trace conductors comprises four electrical signal trace conductors formed in the single layer and following generally parallel paths, two of the conductors for electrically connecting a read element of the head to a preamplifier circuit, and two of the conductors for connecting a write element of the head to a write driver circuit, within the read/write circuitry.

* * * * *